(12) United States Patent
Gunturi et al.

(10) Patent No.: US 11,336,380 B2
(45) Date of Patent: *May 17, 2022

(54) CHANNEL TRACKING METHOD AND MODULE

(71) Applicant: TEXAS INSTRUMENTS INCORPORATED, Dallas, TX (US)

(72) Inventors: Sarma Sundareswara Gunturi, Bengaluru (IN); Chandrasekhar Sriram, Chennai (IN); Jawaharlal Tangudu, Bengaluru (IN); Sashidharan Venkatraman, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,051

(22) Filed: Jun. 19, 2020

(65) Prior Publication Data

US 2020/0322067 A1 Oct. 8, 2020

Related U.S. Application Data

(63) Continuation of application No. 16/661,628, filed on Oct. 23, 2019, now Pat. No. 10,778,344.

(60) Provisional application No. 62/786,506, filed on Dec. 30, 2018.

(30) Foreign Application Priority Data

Nov. 14, 2018 (IN) .............................. 201841042765

(51) Int. Cl.
*H04L 25/03* (2006.01)
*H04B 17/11* (2015.01)
*H04L 27/34* (2006.01)
*H04B 17/10* (2015.01)
*G01S 5/02* (2010.01)

(52) U.S. Cl.
CPC ........... *H04B 17/11* (2015.01); *H04B 17/104* (2015.01); *H04L 27/34* (2013.01); *G01S 5/0273* (2013.01); *H04L 25/03343* (2013.01)

(58) Field of Classification Search
USPC ...................... 375/226, 224, 267; 455/67.13
See application file for complete search history.

(56) References Cited

U.S. PATENT DOCUMENTS

| | | |
|---|---|---|
| 7,020,226 B1 | 3/2006 | Kirkland |
| 8,204,102 B2 | 6/2012 | O'Leary et al. |
| 8,923,110 B2 | 12/2014 | Cheng et al. |
| 10,097,396 B2 | 10/2018 | Sestok, IV |
| 10,382,087 B1 | 8/2019 | Dror et al. |

(Continued)

*Primary Examiner* — Eva Y Puente
(74) *Attorney, Agent, or Firm* — John R. Pessetto; Charles A. Brill; Frank D. Cimino

(57) ABSTRACT

A channel response generating module and method for generating a channel response based on a ratio of a channel response corresponding to an image signal frequency bin in relation to a channel response corresponding to a traffic signal frequency bin, or a channel response corresponding to a first frequency bin in relation to a channel response corresponding to a second frequency bin, and a zero-IF signal transmitter employing the channel response generating module and method to efficiently suppress image signals or compensate traffic signals during transmission of IQ RF signals.

5 Claims, 6 Drawing Sheets

(56) References Cited

U.S. PATENT DOCUMENTS

| | | |
|---|---|---|
| 10,484,108 B1 | 11/2019 | Al-Qaq |
| 10,623,121 B1 | 4/2020 | Satrasala et al. |
| 2004/0203472 A1 | 10/2004 | Chien |
| 2004/0218522 A1 | 11/2004 | Sundstrom et al. |
| 2005/0220056 A1 | 10/2005 | Itoh |
| 2006/0203710 A1 | 9/2006 | Mukkavilli et al. |
| 2008/0025381 A1 | 1/2008 | Lee et al. |
| 2008/0075190 A1* | 3/2008 | Lin ................. H04B 7/082 375/267 |
| 2008/0212662 A1 | 9/2008 | Lee et al. |
| 2010/0027689 A1 | 2/2010 | Kohlmann |
| 2010/0135449 A1 | 6/2010 | Row et al. |
| 2010/0232493 A1 | 9/2010 | Thirumoorthy |
| 2010/0313094 A1 | 12/2010 | Kubota |
| 2010/0330929 A1 | 12/2010 | Heutmaker et al. |
| 2011/0051790 A1 | 3/2011 | Honda |
| 2011/0069744 A1 | 3/2011 | Laudel et al. |
| 2011/0182374 A1 | 7/2011 | Primo et al. |
| 2012/0115412 A1 | 5/2012 | Gainey et al. |
| 2012/0250790 A1 | 10/2012 | Yang et al. |
| 2012/0263215 A1 | 10/2012 | Peng |
| 2012/0300818 A1 | 11/2012 | Metreaud et al. |
| 2012/0328041 A1 | 12/2012 | Chen et al. |
| 2013/0058387 A1 | 3/2013 | Muhammad |
| 2013/0058388 A1 | 3/2013 | Muhammad et al. |
| 2013/0195152 A1 | 8/2013 | Muhammad |
| 2013/0208770 A1 | 8/2013 | Muhammad et al. |
| 2013/0208827 A1 | 8/2013 | Muhammad et al. |
| 2013/0281028 A1* | 10/2013 | Sun .................. H04B 1/7115 455/67.13 |
| 2014/0092947 A1* | 4/2014 | Reial ............... H04L 25/0214 375/224 |
| 2015/0030060 A1 | 1/2015 | Kyosti |
| 2015/0094082 A1 | 4/2015 | Gupta et al. |
| 2015/0229497 A1 | 8/2015 | Dhayni |
| 2016/0182162 A1 | 6/2016 | Belitzer et al. |
| 2016/0323010 A1 | 11/2016 | Wu et al. |
| 2016/0359614 A1 | 12/2016 | Hao et al. |
| 2017/0264477 A1 | 9/2017 | Qu |
| 2019/0036749 A1* | 1/2019 | Erez ................ H04L 27/2602 |
| 2020/0028500 A1 | 1/2020 | Cheng et al. |

\* cited by examiner

CHANNEL TRACKING METHOD AND MODULE

CROSS REFERENCE TO RELATED APPLICATIONS

This continuation application claims priority to U.S. patent application Ser. No. 16/661,628, filed Oct. 23, 2019, which application claims priority to U.S. Provisional Application No. 62/786,506, filed Dec. 30, 2018, and India Provisional Application No. 201841042765, filed Nov. 14, 2018, all of which are hereby incorporated by reference in their entirety.

BACKGROUND

Zero-IF transmitter employs homodyne or direct up-conversion method to transmit a pair of quadrature signals, i.e., signals that differ in phase by 90 degrees. The reference signal of the pair of quadrature signals, which is "in-phase," is referred to as I signal. The signal that is shifted 90 degrees, and is in "quadrature" phase, is referred to as Q signal. During the direct up-conversion, the I and Q baseband signals are mixed with the in-phase and quadrature-phase components of a local oscillator signal to generate RF signals for transmission.

While generating the RF signals, it is important to maintain the amplitude relationship between the I and Q signals to ensure an accurate signal transmission. It is also important to maintain the phase relationship between the in-phase and quadrature-phase components of the local oscillator to prevent a phase skew. In reality, however, errors such as an IQ gain/phase imbalance existing in a zero-IF transmitter impairs the amplitude and phase relationship between the I and Q components of the RF signals. The transmission of the IQ RF signals is further complicated by a direct current (DC) offset present in IQ signals. This causes the local oscillator signal leaking into transmission (i.e., LO leakage).

A correction is attempted to compensate for impairments caused by IQ mismatch and DC offset by looping back the IQ RF signals through a feedback chain, and correlating the IQ baseband signal and the observed feedback signal to estimate relevant channel responses. Estimating relevant channel responses requires transmission of signals, from which feedback signals are obtained to perform a correlation to derive a channel response. Frequent transmission of signals to estimate channel responses may violate the regulatory specifications to adhere to FCC emission standards.

SUMMARY

An aspect of the present invention provides a channel response generating module comprising a channel response tracker configured to compute a ratio of a channel response corresponding to an image signal frequency bin in relation to a channel response corresponding to a traffic signal frequency bin. Based on the ratio, the channel response generating module generates a channel response corresponding to the image signal frequency bin after a change in channel response corresponding to the traffic signal frequency bin.

Another aspect of the present invention provides a zero-IF signal transmitter comprising a channel response generating module configured to generate a channel response corresponding to an image signal frequency bin after a change in channel response corresponding to a traffic signal frequency bin, and an IQ mismatch corrector configured to adjust baseband signals based on the channel response generated by the channel response generating module.

Another aspect of the present invention provides a channel response generating method comprising estimating a channel response corresponding to a traffic signal frequency bin and a channel response corresponding to an image signal frequency bin, computing a ratio between the two channel responses, and computing a subsequent channel response corresponding to the image signal frequency bin based on the ratio after a change in the channel response corresponding to the traffic signal frequency bin.

Another aspect of the present invention determines a channel response corresponding to a second frequency bin based on a channel ratio of the channel response corresponding to the second frequency bin and a channel response corresponding to a first frequency bin. The channel response corresponding to the second frequency bin is determined when the channel response corresponding to the first frequency bin changes, after a preset of time has lapsed since the determination of the channel response corresponding to the second frequency bin has been made, or in a situation where a new determination of a channel response corresponding to the second frequency bin is desired.

BRIEF DESCRIPTION OF THE DRAWINGS

For a detailed description of various examples, reference will now be made to the accompanying drawings in which.

DETAILED DESCRIPTION

In the following detailed description, reference is made to certain examples of the present invention. These examples are described with sufficient detail to enable those skilled in the art to practice them. It is to be understood that other examples may be employed and that various structural, logical, and electrical changes may be made. Moreover, while specific examples are described in connection with a zero-IF transmitter, it should be understood that features described herein are generally applicable to other types of electronic parts, circuits, or transmitters.

In this description, the term "couple" or "couples" means either an indirect or direct wired or wireless connection. Thus, if a first device couples to a second device, that connection may be through a direct connection or through an indirect connection via other devices and connections. In another instance, when a first device is coupled to a second device, the first and second device may be coupled through a capacitor. The recitation "based on" means "based at least in part on." Therefore, if X is based on Y, X may be a function of Y and any number of other factors.

Figure 1:
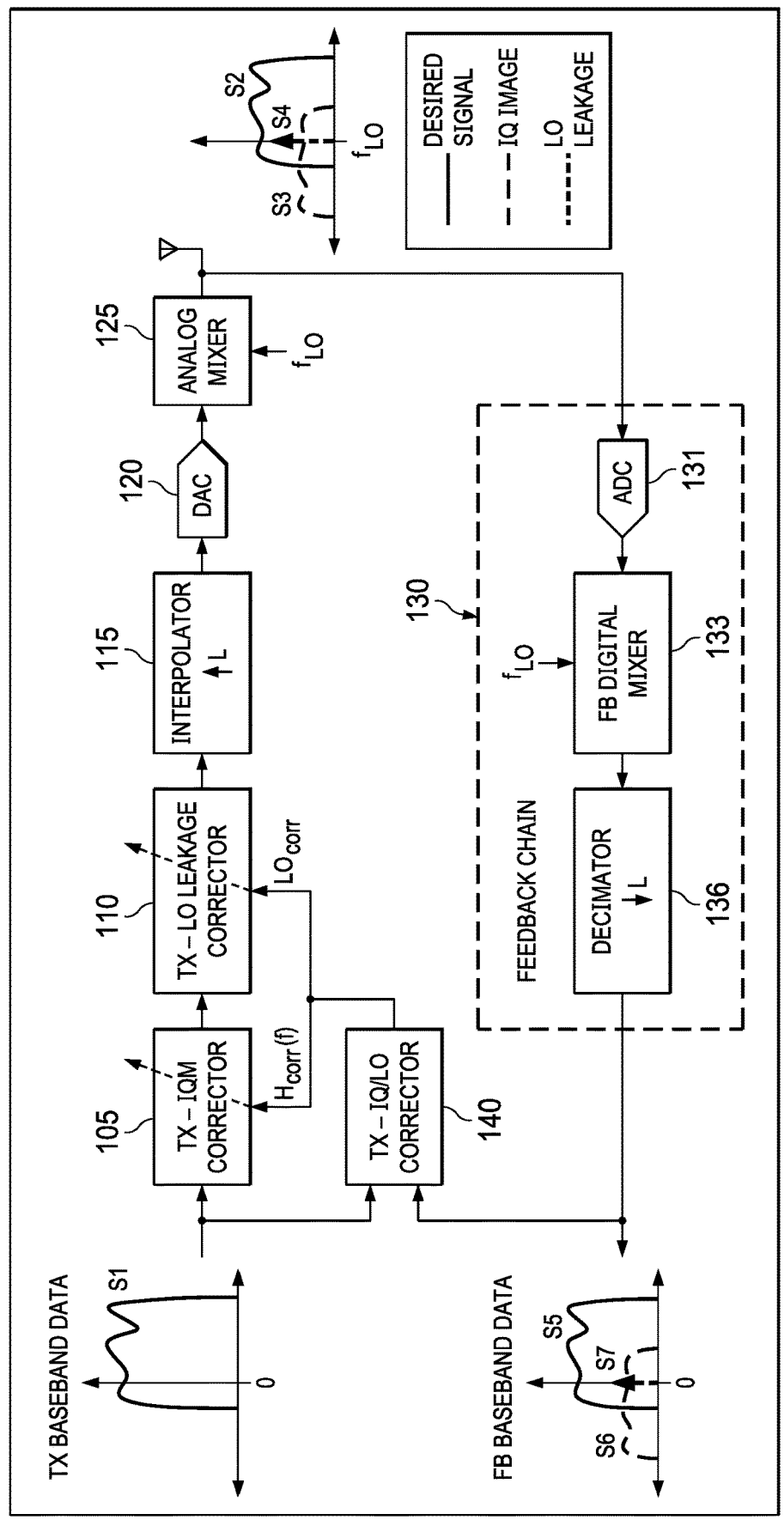
FIG. 1 illustrates a block diagram of a zero-IF transmitter.

FIG. 1 illustrates a block diagram of a zero-IF transmitter. The zero-IF transmitter example of FIG. 1 comprises Tx-IQM corrector 105 configured to adjust the baseband signal S1 to compensate for an IQ mismatch during transmission, Tx-LO leakage corrector 110 configured to adjust the baseband signal S1 to compensate for LO leakage during transmission, interpolator 115, IQ digital analog converter 120, and analog mixer 125 configured to mix the baseband signal S1 with an in-phase and quadrature-phase components of a local oscillator signal of frequency $f_{LO}$.

Signals S2, S3, and S4 are signals observed by a receiver after the zero-IF transmitter of FIG. 1 transmits IQ RF signals based on signal S1. Signal S2 is a signal intended to be transmitted by the zero-IF transmitter, which is a traffic signal. Signal S3 is an image signal of signal S2 due to IQ mismatch, and signal S4 is a LO leakage due to DC offset in the transmitter. Feedback chain 130 loops back the transmit signals, signals S2, S3, and S4, through a feedback RF analog to digital converter 131, feedback digital mixer 133 mixing the feedback signal with a local oscillator signal of frequency $f_{LO}$, and decimator 136.

Signals S5, S6, and S7 are signals measured at an end of feedback chain 130 after the transmit signals S2, S3, and S4 are looped back. Signal S5 corresponds to signal S2, signal S6 to signal S3, and signal S7 to signal S4. Tx-IQ/LO estimator 140 estimates a channel response based on signals S1 and S5-S7, and further estimates IQ mismatch and LO leakage for a respective frequency or frequency bin. Based on the IQ mismatch and LO leakage estimates, Tx-IQ/LO estimator 140 further provides a IQ mismatch correction function $H_{corr}(f)$ and LO leakage correction function $LO_{corr}$ to Tx-IQM corrector 105 and Tx-LO leakage corrector 110. Tx-IQM corrector 105 and Tx-LO leakage corrector 110 adjust signal S1 to compensate for IQ mismatch and LO leakage during transmission based on $H_{corr}(f)$ and $LO_{corr}$, respectively.

Figure 2A:
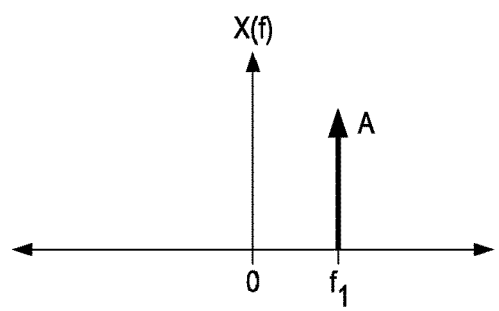
FIGS. 2A and 2B illustrate a frequency spectrum of a baseband signal and a frequency spectrum of feedback signal derived from a signal transmitted via a direct up-conversion.
Figure 2B:
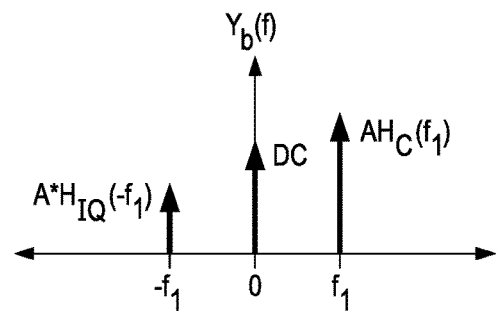

FIGS. 2A and 2B illustrate an exemplary frequency spectrum of a baseband signal transmitted via a direct up-conversion and a frequency spectrum of a feedback signal at an output of feedback chain 130. In particular, graph of FIG. 2A illustrates a single tone signal of frequency bin $f_1$, Tx signal X(f), transmitted via a zero-IF transmitter. Based on the single tone signal of graph 2A, the zero-IF transmitter generates a pair of IQ signals (i.e., quadrature signals) for transmission.

The pair of baseband quadrature signals is mixed with the in-phase and quadrature-phase components of a local oscillator signal with frequency $f_o$ to generate a pair of RF quadrature signals for transmission. During the oscillation, however, IQ gain or phase imbalance may be introduced, skewing the gain or phase relationship of the RF quadrature signals. This results in a transmission of an image signal, a signal with frequency bin $f_o-f_1$, in addition to the transmission of a traffic signal, a signal with frequency bin $f_o+f_1$. Furthermore, the local oscillator signal may leak and be transmitted with the traffic signal. Local oscillator leakage (i.e., LO leakage) is the result of the DC signal in the analog baseband signal mixing with the local oscillator with frequency $f_o$.

Graph of FIG. 2B illustrates a frequency spectrum of feedback baseband signal $Y_b(f)$ observed by the zero-IF transmitter after or with the transmission of the pair of RF quadrature signals based on Tx signal X(f). The feedback signal is down-converted by a local oscillator with frequency $f_o$ in feedback module 130. Although only a single tone signal of amplitude A and frequency $f_1$, illustrated in graph 2(a), was up-converted for transmission by the zero-IF transmission, feedback baseband signal $Y_b(f)$ comprises three tones as illustrated in graph 2B.

The three tones are $AH_C(f_1)$, DC and $A*H_{IQ}(-f_1)$, as shown in graph 2B. $AH_C(f_1)$ corresponds to the traffic signal of frequency bin $f_o+f_1$ that is transmitted to a receiver, wherein $H_C(f_1)$ is a channel response at frequency bin $f_1$. DC corresponds to the leaked local oscillator signal of frequency $f_o$ that is transmitted to the receiver. $A*H_{IQ}(-f_1)$ corresponds to an image signal of frequency bin $f_o-f_1$ transmitted to the receiver due to the IQ mismatch of the zero-IF transmitter. In the term $A*H_{IQ}(-f_1)$, $A*$ represents complex conjugate of A.

To compensate for an IQ mismatch and LO leakage, the zero-IF transmitter may adjust signal X(f) to cancel out tones $A*H_{IQ}(-f_1)$ and DC during transmission. Typically, wireless infrastructure devices have stringent requirement on residual LO leakage and Tx IQ mismatch. To adjust a signal to compensate the changes due to an IQ mismatch and LO leakage, channel responses at a frequency bin corresponding to the image signal and LO leakage, as well as channel responses at traffic signal frequency bins, must be estimated.

During a steady state operation, traffic signals being transmitted keeps on changing, which in turn leads to changes in channel responses. Channel responses may also change due to changes in temperature or other operating conditions. Under these dynamic signal conditions, a wireless device is expected to quickly converge to the required IQ mismatch correction and LO leakage correction. Estimation of channel responses, however, takes time.

According to an aspect of the present invention, a ratio of image signal channel response to traffic signal channel response is calculated based on a traffic signal, a feedback signal, and an image signal. After a change to a channel response of a traffic signal bin, a channel response of the corresponding image signal bin is obtained based on the ratio and the changed traffic signal channel response. Similarly, a ratio of LO leakage bin channel response to a traffic signal channel response is calculated based on a traffic signal, a feedback signal and LO leakage. After a change in an operating condition of a wireless signal, an updated LO leakage bin channel response is obtained based on the ratio and the changed traffic signal channel response.

Where more than one traffic signal channel responses exist, each corresponding to a bin of traffic signal bins, quality metric of such channel responses or channel ratio may be calculated. Updates to image signal channel response and LO leakage bin channel response may be based on a ratio with high quality metrics.

Figure 3:
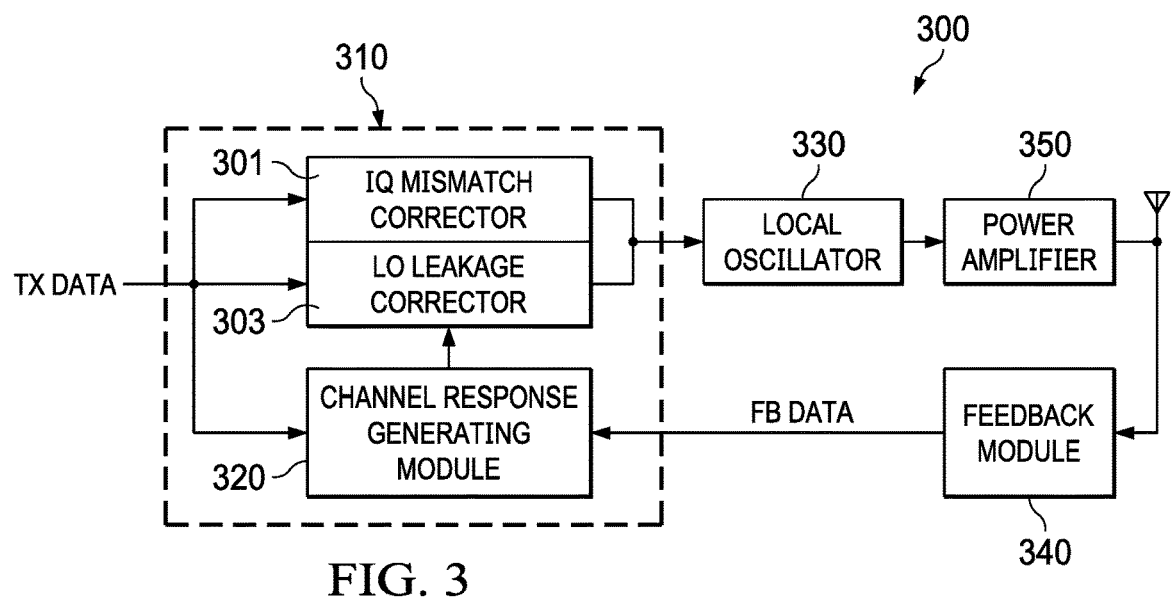
FIG. 3 illustrates a block diagram of a zero-IF signal transmitter according to an aspect of the present invention.

FIG. 3 illustrates a block diagram of a zero-IF signal transmitter according to an aspect of the present invention. In the example of FIG. 3, zero-IF signal transmitter 300 comprises a quadrature signal correction module 310 configured to adjust a pair of quadrature signals input for transmission to compensate for an IQ mismatch or LO leakage during the transmission, local oscillator 330 configured to mix the corrected signal output from quadrature signal correction module 310 with in-phase and quadrature-phase components of an oscillating signal, and power amplifier 350 configured to amplify the oscillated IQ RF signals for transmission. Zero-IF signal transmitter 300 further comprises an interpolator, a baseband signal digital analog converter to process Tx data for transmission, and additional modules required to process an output of local oscillator 330 for transmission, which are omitted from FIG. 3.

Feedback module 340 loops back the IQ RF signals output from power amplifier 350 and reverse processes the IQ RF signals to obtain feedback (FB) data, which is a baseband signal, comparable with the Tx data. In FIG. 3, a local oscillator is a component of feedback module 340, as well as a RF signal analog digital converter and a decimator for down converting are components of feedback module 340. Zero-IF signal transmitter 300 may further comprise additional modules required to process an output of power amplifier 350 to generate the feedback data, which are omitted from FIG. 3.

Quadrature signal correction module 310 of FIG. 3 comprises channel response generating module 320 configured to generate a channel response based on Tx data and FB data, IQ mismatch corrector 301 configured to adjust Tx data to compensate for IQ mismatch based on a channel response output from channel response generating module 320, and LO leakage corrector 303 configured to adjust Tx data to compensate for LO leakage based on a channel response output from channel response generating module 320.

Figure 4:
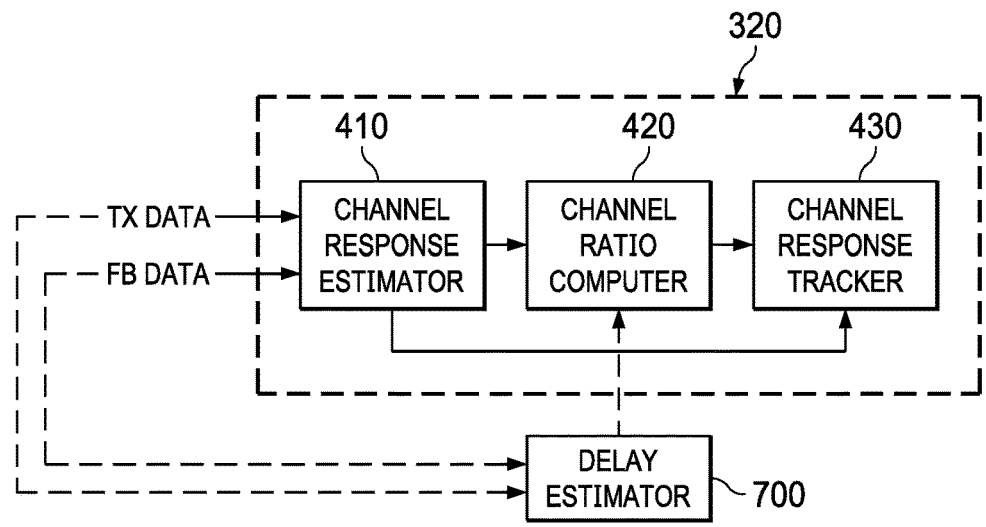
FIG. 4 illustrates a block diagram of a channel response generating module according to an aspect of the present invention.

FIG. 4 illustrates a block diagram of channel response generating module 320 of FIG. 3 according to an aspect of the present invention. As illustrated in FIG. 4, channel response generating module 320 comprises channel response estimator 410 configured to estimate a channel response based on Tx data and FB data, a channel ratio computer 420 configured to compute ratio of channel responses estimated by channel response estimator 410, and channel response tracker 430 configured to compute a channel response based on channel ratio computed by channel ratio computer 420, and channel response estimator 410. Channel response generating module 320 may optionally comprise delay estimator 700, which is be explained further below in relation to FIG. 7.

In FIG. 4, channel response estimator 410 is configured to generate a first channel response corresponding to a first frequency bin $f_1$ based on (a) a pair of quadrature signals of frequency bin $f_1$, and (b) a FB signal output from feedback module 340 based on the pair of quadrature signals of frequency bin $f_1$. Channel response estimator 410 is further configured to generate a second channel response corresponding to a second frequency bin $-f_1$ based on (a) another pair of quadrature signals of frequency bin $-f_1$, and (b) a FB signal output from feedback module 340. The second frequency bin $-f_1$ corresponds to an image signal of the pair of quadrature signals of frequency bin $f_1$.

In one example, the first channel response is estimated by channel response estimator 410 by comparing the Tx signal of first frequency bin $f_1$ to the FB signal corresponding to the first frequency bin. For example, in FIG. 2, first channel response may be estimated by dividing FB signal $Y_b(f)$ corresponding to frequency bin $f_1$, which is a tone signal of amplitude $AH_C(f_1)$, by Tx signal $X(f)$ at frequency $f_1$ of amplitude A.

The second channel response may also be estimated by channel response estimator 410 by comparing the Tx signal of second frequency bin $-f_1$ to the FB signal corresponding to the second frequency bin $-f_1$. Alternatively, the second channel response may be estimated by a channel response estimation method and according to a channel response estimating system for an image signal bin described in U.S. provisional application No. 62/786,496 and India provisional application no. 201841044799, which are incorporated herein in their entirety.

Channel ratio computer 420 is configured to compute a channel ratio based on the first channel response and second channel response according to the equation 1 below.

$$H_{ratio}(-f_1) = H(-f_1)/H(f_1) \quad \text{Eq. 1)}$$

In the above equation, $H_{ratio}(-f_1)$ is a channel ratio of $H(-f_1)$ to $H(f_1)$, wherein $H(f_1)$ is the first channel response, and $H(-f_1)$ is the second channel response.

Channel response estimator 410 is also configured to estimate a subsequent channel response corresponding to the first frequency bin $f_1$ based on a subsequent pair of quadrature signals of first frequency bin $f_1$ and a FB signal based on the subsequent pair. In an example, the subsequent pair of quadrature signals is generated and processed by the zero-IF signal transmitter of FIG. 3 where there is a change in temperature. In another example, the subsequent pair of quadrature signals is generated and processed by the zero-IF signal transmitter of FIG. 3 where a component of the zero-IF signal transmitter has changed (e.g., digital analog converter or an amplifier), leading to a change in a channel response corresponding to the first frequency bin $f_1$. Yet in another example, a subsequent channel response for the first frequency bin $f_1$ may be estimated based on a subsequent traffic signal at the first frequency bin $f_1$.

Based on the subsequent channel response and channel ratio, channel response tracker 430 is configured to compute a third channel response, corresponding to frequency bin $-f_1$ according to the equation 2 below.

$$\hat{H}(f_1) * H_{ratio}(-f_1) \quad \text{Eq. 2)}$$

In the above equation, $\hat{H}(f_1)$ is the subsequent channel response corresponding to the first frequency bin $f_1$. Because third channel response corresponding to frequency bin $-f_1$ is computed by channel response tracker 430, there is no need for channel response estimator 410 to estimate a subsequent channel response corresponding to frequency bin $-f_1$, in addition to the subsequent channel response corresponding to frequency bin $f_1$, after the change in temperature or a component of a zero-IF signal transmitter or a subsequent traffic signal at the first frequency bin $f_1$.

Channel response estimator 410 of FIG. 4 is further configured to estimate a fourth channel response corresponding to a local oscillator frequency bin based on (a) the pair of quadrature signals of first frequency bin $f_1$, and (b) a FB signal output from feedback module 340 based on the pair of quadrature signals.

Channel ratio computer 420 may also be further configured to compute a channel ratio based on the first channel response and the fourth channel response according to the equation 3 below.

$$H_{ratio}(LO) = H(LO)/H(f_1) \quad \text{Eq. 3)}$$

In the above equation, $H_{ratio}(LO)$ is the local oscillator frequency channel ratio, $H(f_1)$ is the first channel response, and $H(LO)$ is the fourth channel response.

After a change in temperature or a component in a zero-IF signal transmitter, or after the transmission of subsequent traffic signal at first frequency bin $f_1$, channel response tracker 430 computes a fifth channel response corresponding to the local frequency based on the channel ratio related to local oscillator frequency bin according to the equation 4 below.

$$\hat{H}(f_1) * H_{ratio}(LO) \quad \text{Eq. 4)}$$

In the above equation, $\hat{H}(f_1)$ is the subsequent channel response corresponding to the first frequency bin $f_1$ estimated by channel response estimator 410 based on a subsequent pair of quadrature signals of first frequency bin $f_1$ and a FB signal based on the subsequent pair. For instance, the subsequent pair of quadrature signals is generated and processed by the zero-IF signal transmitter after a change in temperature of component. The FB signal of the subsequent pair of quadrature signals is input to channel response estimator 410 from feedback module 340.

An example of the present invention may measure quality metrics associated with a channel response based on a noise level, signal to noise ratio (SNR) or a signal strength of a pair of quadrature signals or a FB signal based on the pair of quadrature signals. The example may rely on the channel ratio computed based on a frequency bin associated with a high or above threshold quality metrics.

According to an aspect of the present invention, a quality metric of a channel response (e.g., image signal channel response, LO channel response) calculated based on a channel ratio and another channel response (e.g., traffic signal channel response) is based on a quality metric of the channel ratio or the another channel response. A channel ratio may be updated based on available traffic signal bins and their respective FB signals.

An example of computing a quality metric of a channel ratio based on the quality metrics of the numerator and denominator channel responses is introduced below. In equation 5, $e_n$ and $e_d$ respectively represents the quality metrics for channel response at image bin and traffic signal. In such case the quality metric of the channel ratio can be derived according to the below equation 5.

$$\frac{H(-f_1) + e_n}{H(f_1) + e_d} = \qquad \text{Eq. 5)}$$

$$\frac{H(-f_1)\left(1 + \frac{e_n}{H(-f_1)}\right)}{H(f_1)\left(1 + \frac{e_d}{H(f_1)}\right)} = \frac{H(-f_1)}{H(f_1)}\left(1 + \frac{e_n}{H(-f_1)} - \frac{e_d}{H(f_1)}\right) =$$

$$\frac{H(-f_1)}{H(f_1)} + \frac{e_n}{H(f_1)} - \frac{H(-f_1)e_d}{(H(f_1))^2}$$

In the above equation 5, the quality metric for the channel ratio is $$\frac{e_n}{H(f_1)} - \frac{H(-f_1)e_d}{(H(f_1))^2}.$$

Assume $X(f)$ is a known transmitter signal at a frequency bin f, and the baseband signal at feedback channel output is $Y_b(f)$ (e.g., FIG. 2B). The transmitter and feedback thermal noise in this example is respectively denoted as $W_t(f)$ and $W_{fb}(f)$, and the channel response on the frequency bin f as $H(f)$. In such case, the feedback output $Y_b(f)$ is expressed according to below equation 6.

$$Y_b(f) = H(f)(X(f) + W_t(f)) + W_{fb}(f) \qquad \text{Eq. 6)}$$

The channel response is estimated as $Y_b(f)/X(f)$. Thus, if the error in channel response $H(f)$ is denoted by $H_e(f)$, then $$H_e(f) = \frac{H(f)W_t(f)}{X(f)} + \frac{W_{fb}(f)}{X(f)} \qquad \text{Eq. 6)}$$

The quality metric of channel response $H(f)$ is the power in the error $H_e(f)$, i.e., $E|H_e(f)|^2$, where $E(x^2)$ denotes the expectation of $x^2$. The signals $X(f)$, $W_t(f)$ and $W_{fb}(f)$ are independent of each other. The quality metric of channel response can be approximated as below equation 7.

$$\frac{|H(f)|^2 \sigma_t^2}{\sigma^2} + \frac{\sigma_{fb}^2}{\sigma^2}, \qquad \text{Eq. 7)}$$

wherein $\sigma_t^2$, $\sigma_{fb}^2$ and $\sigma^2$ are respectively a noise power in the frequency bin f of Tx thermal noise, feedback thermal noise and transmitter signal power.

Using the above described quality metric computation, the quality metric of traffic signal bin and image signal bin can be computed. Based on these quality metrics, the quality metric of the channel ratio is also computed.

Analogously, if channel at LO bin is to be estimated and if there is no traffic signal present at LO, then the channel is estimated by transmitting controlled signal at LO bin. The channel estimation and the quality metric of the LO channel response is described below.

For a channel estimate, a small DC signal with respect to the signal power is transmitted. In one measurement time, a known DC level of $\Delta/2$ is transmitted and in the next measurement time, $-\Delta/2$ is transmitted. The observation corresponding to these two input DC levels is expressed in below equation 8.

$$\sum_{n=0}^{N-1} f_1(n) = h\left(\sum_{n=0}^{N-1} x_1(n) + \frac{\Delta}{2}N + dc_{res} + \sum_{n=0}^{N-1} w_{t_1}(n)\right) + \sum_{n=0}^{N-1} w_{f_1}(n) \qquad \text{Eq. 8)}$$

$$\sum_{n=0}^{N-1} f_2(n) = h\left(\sum_{n=0}^{N-1} x_2(n) - \frac{\Delta}{2}N + dc_{res} + \sum_{n=0}^{N-1} w_{t_2}(n)\right) + \sum_{n=0}^{N-1} w_{f_2}(n)$$

where $f_1(n)$, $f_2(n)$ is a signal at FB output, $x_1(n)$, $x_2(n)$ is a input Tx signal, $w_{t_1}(n)$, $w_{t_2}(n)$ is a Tx thermal noise, $w_{f_1}(n)$, $w_{f_2}(n)$ is a FB thermal noise and N is the number of samples.

The instantaneous channel estimate ($\hat{h}$) is expressed as below equation 9 and the error in channel estimate ($h_{error}$) is expressed as below equation 10.

$$\hat{h} = \frac{\sum_{n=0}^{N-1} f_1(n) - \sum_{n=0}^{N-1} f_2(n)}{\Delta N + \sum_{n=0}^{N-1} x_1(n) - \sum_{n=0}^{N-1} x_2(n)} \qquad \text{Eq. 9)}$$

$$h_{error} = \frac{h\left(\sum_{n=0}^{N-1} w_{t_1}(n) - \sum_{n=0}^{N-1} w_{t_2}(n)\right) + \sum_{n=0}^{N-1} w_{f_1}(n) - \sum_{n=0}^{N-1} w_{f_2}(n)}{\Delta N + \sum_{n=0}^{N-1} x_1(n) - \sum_{n=0}^{N-1} x_2(n)} \qquad \text{Eq. 10)}$$

In the above example, the quality metric of channel estimate is expressed as equation 11 and equation 12 below, $$|e|^2 = \frac{|h|^2\left(\sum_{n=0}^{N-1}|w_{t_1}(n)|^2 + \sum_{n=0}^{N-1}|w_{t_2}(n)|^2\right)}{\left|\Delta N + \sum_{n=0}^{N-1}x_1(n) - \sum_{n=0}^{N-1}x_2(n)\right|^2} \sum_{n=0}^{N-1}|w_{f_1}(n)|^2 + \sum_{n=0}^{N-1}|w_{f_2}(n)|^2 + \qquad \text{Eq. 11}$$

$$\sigma_h^2 = \frac{2N\sigma_f^2 + |h|^2 2N\sigma_t^2}{\left|\Delta N + \sum_{n=0}^{N-1}x_1(n) - \sum_{n=0}^{N-1}x_2(n)\right|^2} \qquad \text{Eq. 12}$$

where $|e|^2$ is the absolute square of a channel error, $h_{error}$, and $\sigma_h^2$ is power in the channel error.

Figure 5:
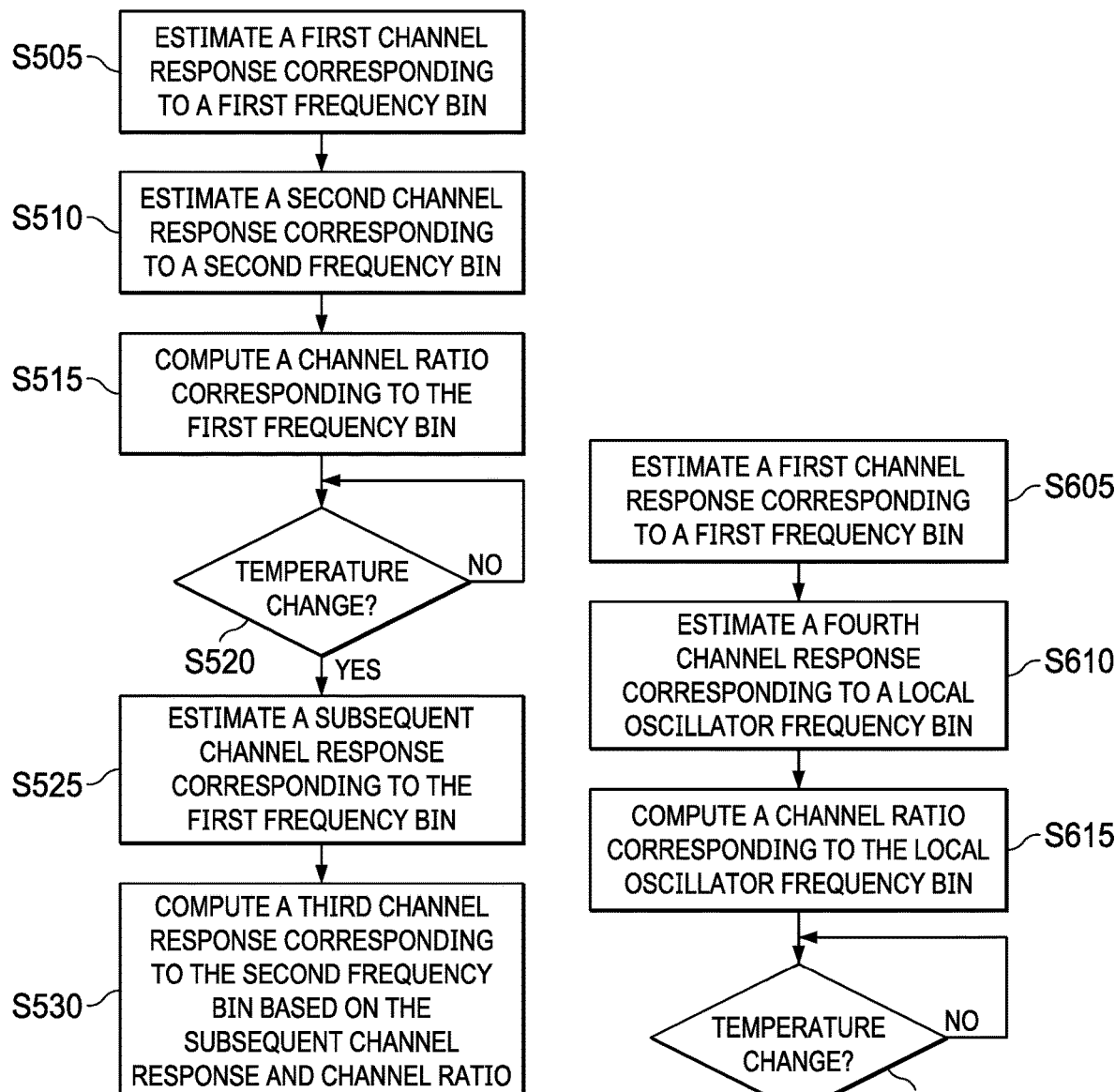
FIG. 5 illustrates a flow chart of a channel response generating method according to an aspect of the present invention.

FIG. 5 illustrates a flow chart of a channel response generating method according to an aspect of the present invention. In the method of FIG. 5, a first channel response, $H(f_1)$, corresponding to a first frequency bin, $f_1$, is estimated. (S505). Thereafter, a second channel response $H(-f_1)$, corresponding to a second frequency bin (or an image signal frequency bin), $-f_1$, is estimated. (S510). The first and second channel responses may be estimated as disclosed in relation to FIGS. 3, 4, and 7.

Once the first and second channel responses are estimated, the method of FIG. 5 computes a channel ratio according to equation 1 noted above. (S515). After a temperature change or a component change in, or a transmission of a subsequent traffic signal at first frequency bin $f_1$ by, a zero-IF signal transmitter employing the method of FIG. 5 (S520), a subsequent channel response corresponding to first frequency bin $f_1$ is again estimated. (S525). The subsequent channel response may be estimated by comparing the Tx signal of first frequency bin $f_1$ to the FB signal corresponding to the first frequency bin, as in step 505 (S505).

Based on the subsequent channel response $\hat{H}(f_1)$ and the computed channel ratio, a third channel response corresponding to second frequency bin $-f_1$, which is a channel response desired (desired channel response) in the example of FIG. 5, is computed according to equation 2 noted above. (S530).

Figure 6:
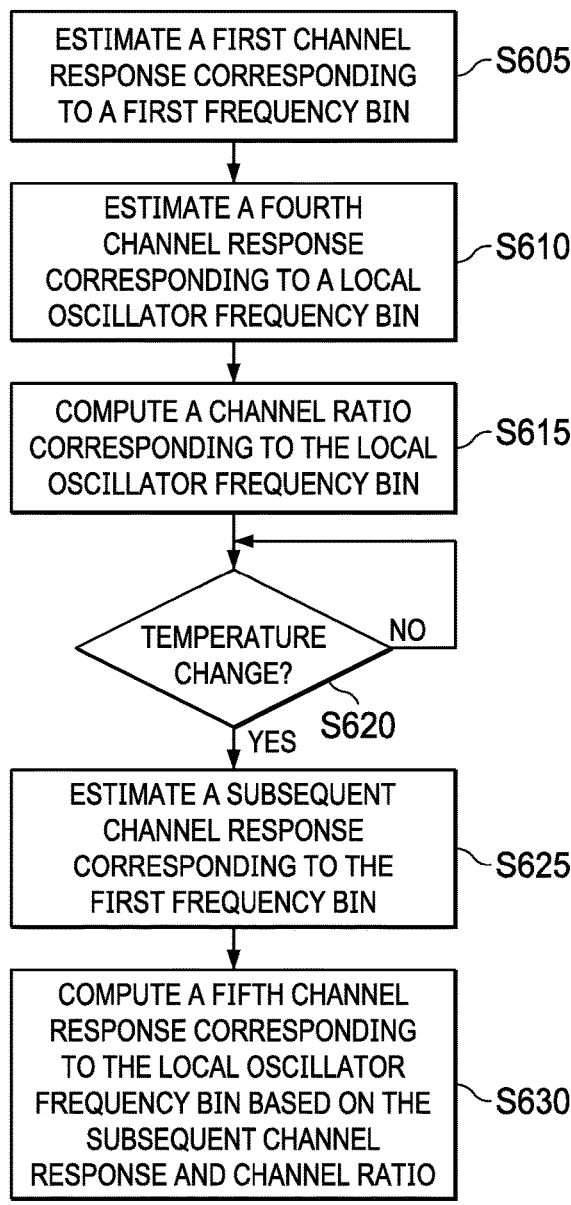
FIG. 6 illustrates a flow chart of a channel response generating method according to yet another aspect of the present invention.

FIG. 6 illustrates a flow chart of a channel response generating method according to an aspect of the present invention. In the method of FIG. 6, a first channel response, $H(f_1)$, corresponding to a first frequency bin, $f_1$, is estimated. (S605). Thereafter, a fourth channel response H(LO), corresponding to a local oscillator frequency bin, $f_o$, is estimated. (S610). The first and fourth channel responses may be estimated as disclosed in relation to FIGS. 3, 4 and 7.

Once the first and fourth channel responses are estimated, the method of FIG. 6 computes a channel ratio according to equation 3 noted above. (S615). After a temperature change or a component change in, or a transmission of a subsequent traffic signal at first frequency bin $f_1$ by, a zero-IF signal transmitter employing the method of FIG. 6 (S620), a subsequent channel response corresponding to first frequency bin $f_1$ is again estimated following a transmission of a subsequent pair of quadrature signals of first frequency bin $f_1$. (S625). The subsequent channel response may be estimated by comparing the Tx signal of first frequency bin $f_1$ to the FB signal corresponding to the first frequency bin, as in step 605 (S605).

Based on the subsequent channel response $\hat{H}(f_1)$ and the computed channel ratio, a fifth channel response corresponding to the local oscillator frequency, which is a desired channel response in the example of FIG. 6, is computed according to equation 4 noted above. (S630).

Figure 7A:
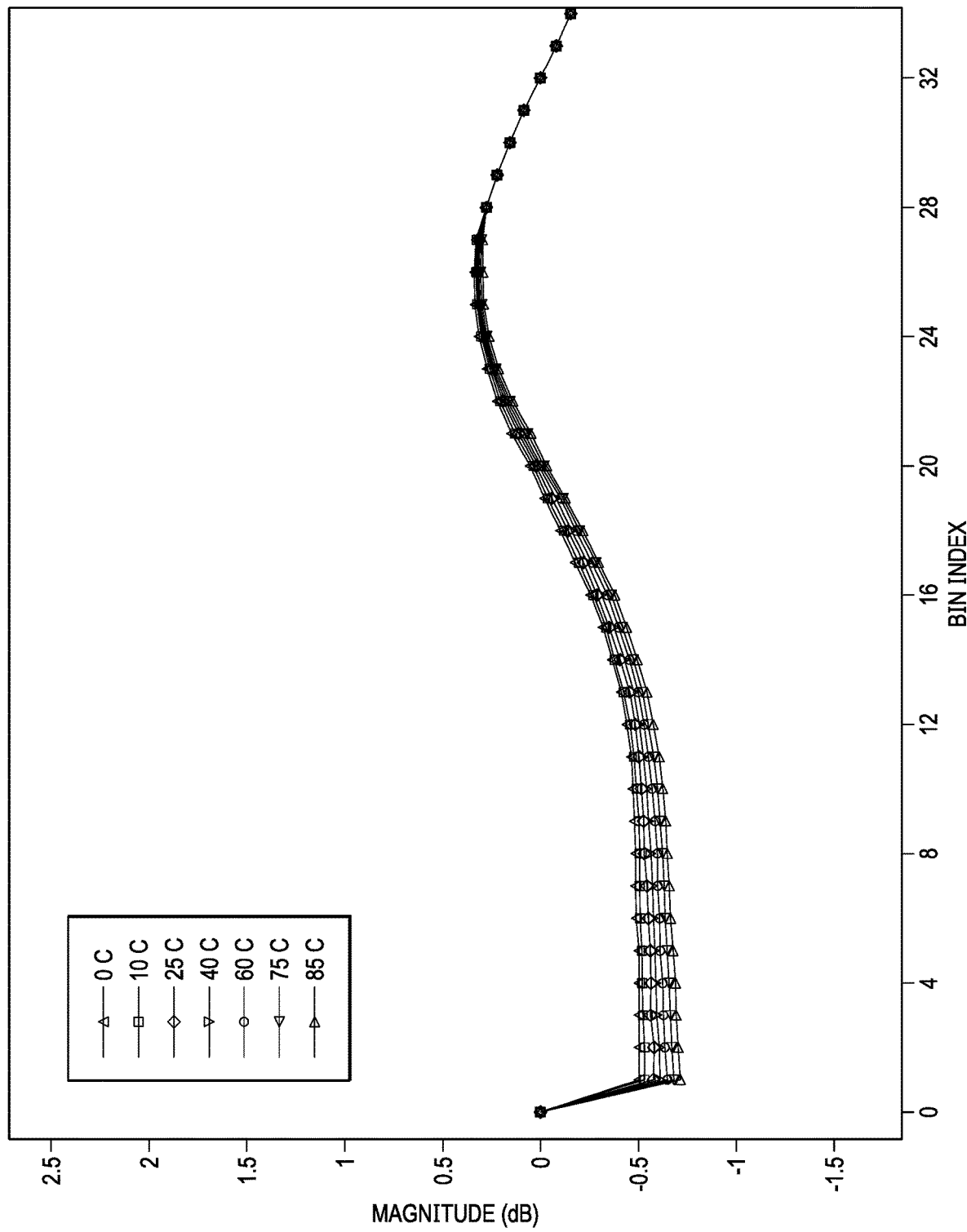
FIGS. 7A and 7B illustrate graphs demonstrating a change in channel ratio in response to change in temperature.
Figure 7B:
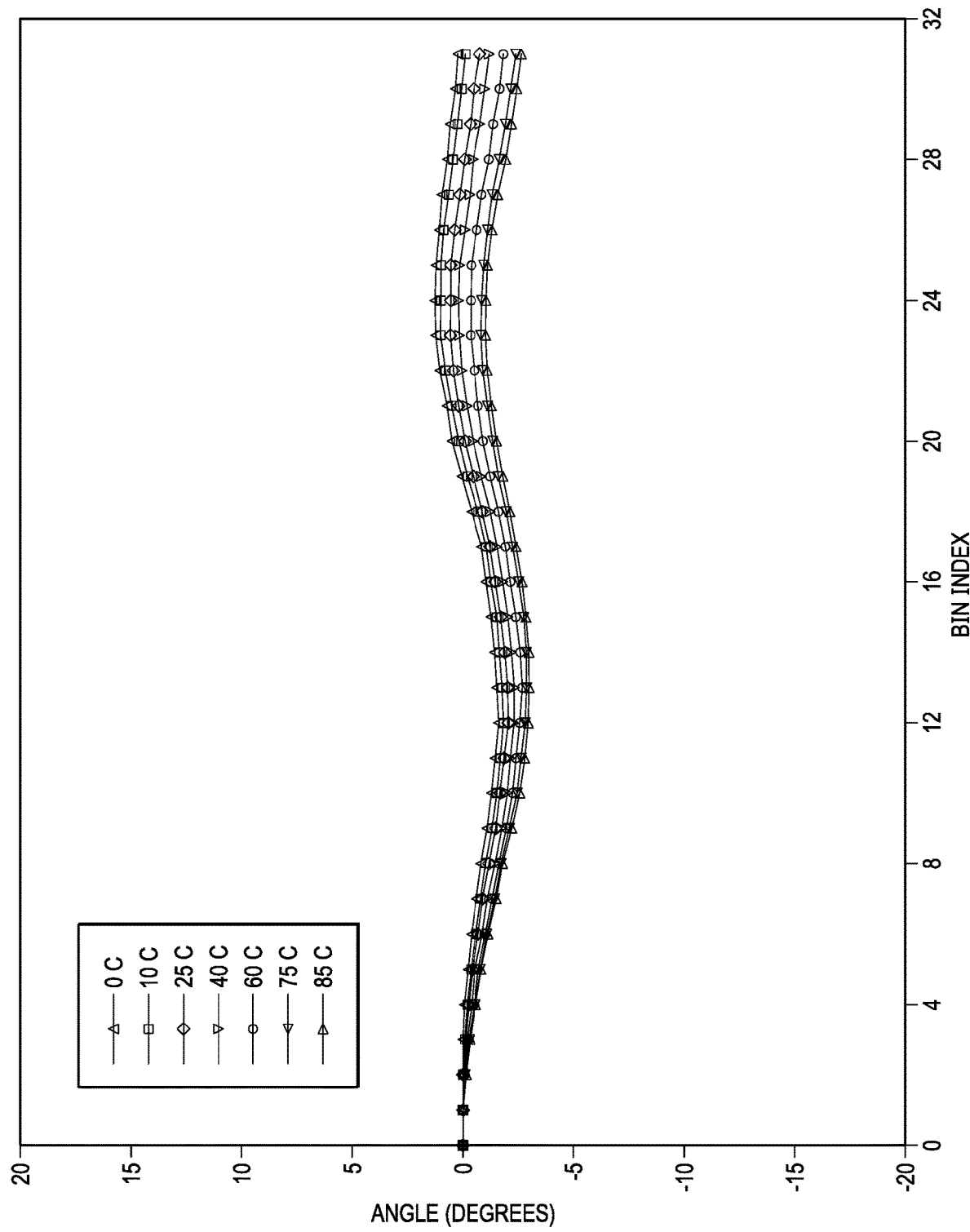

FIGS. 7A and 7B illustrate graphs demonstrating a change in channel ratio in response to change in temperature. In particular, graph of FIG. 7A illustrates the change in magnitude of a channel ratio corresponding to a frequency bin over a change in temperature. Graph of FIG. 7B illustrates the change in phase of a channel ratio corresponding to a frequency bin over a change in temperature. As observed in both graphs of FIGS. 7A and 7B, a channel ratio corresponding to a specific frequency bin is almost constant across temperature.

Accordingly, where a channel response corresponding to a traffic signal's frequency bin is estimated, a channel response corresponding to an image signal of the traffic signal's frequency bin is calculated based on the channel response corresponding to the traffic signal's frequency bin and the channel ratio of an image signal channel response to the traffic signal channel response.

A transmission (Tx) to feedback (FB) channel depends on the Tx to FB loopback delay. Change in Tx to FB delay changes the channel response. The change in channel response, in turn, changes the channel ratio. According to an embodiment of the present invention, after a change in delay, a channel ratio may be recomputed by estimating the channel response at the traffic signal bin and the channel response at the desired bin. The ratio of the channel response at the desired bin and the channel response on the traffic signal bin provides the new channel ratio. In an alternate embodiment, the first channel ratio can be updated based on the new Tx-FB loopback delay to provide the new channel ratio.

Usually, a Tx data and a FB data can be captured with a time offset to account for the delay between Tx and FB loopback. There are two different scenarios of the Tx-FB loopback delay change. In the first scenario, the actual delay between Tx to FB does not change but the delay estimation scheme provides an updated and potentially better) estimate of the delay. The capture time offset, however, is not updated to accommodate the new delay estimate. In the second scenario, the actual delay between Tx to FB changes and the delay estimation scheme estimates the new delay. The capture time offset is updated with the new delay estimate.

In the first scenario, an actual delay between Tx and FB is denoted T. The estimate of delay between Tx and FB provided by a delay estimation scheme is denoted $\tau$. The capture offset between Tx data and FB data collection is programmed with the value $\tau$. The error in the delay estimate is denoted as $\Delta = T - \tau$. If the capture time offset is set to T, then the channel response is assumed to be an ideal time domain channel response from Tx to FB: this ideal time domain channel response is denoted h(t) and occurs when $\Delta = 0$. With the delay estimated as $\tau$, however, the error in delay estimate leads to a channel being estimated, which is expressed as $h(t-\Delta)$, $H(f_1)$ is a channel response at frequency bin $f_1$ for the ideal time domain channel h(t). With capture offset, $\tau$, an initial channel response at traffic bin $f_1$ is $H(f_1)e^{-j2\pi f_1 \Delta}$. Similarly, a channel response at a desired image bin is $H(-f_1)e^{j2\pi f_1 \Delta}$. The initial channel ratio, accordingly, may be expressed as below equation 13.

$$H_{ratio}(-f_1) = \frac{H(-f_1)e^{j2\pi f_1 \Delta}}{H(f_1)e^{-j2\pi f_1 \Delta}} = \frac{H(-f_1)e^{j4\pi f_1 \Delta}}{H(f_1)} \qquad \text{Eq. 13}$$

Subsequently, a delay estimate scheme provides an updated estimate of Tx to FB delay to be $\tau_1$. The capture offset is programmed to $\tau_1$. In such case, the error in the delay estimate may be denoted $\Delta_1 = T - \tau_1$. The error in delay estimate leads to a time domain channel response expressed as $h(t - \Delta_1)$. Accordingly, a frequency domain channel response at frequency bin $f_1$ is expressed as $H(f_1)e^{-j2\pi f_1 66_1}$, and a channel response at desired image bin is expressed as $H(-f_1)e^{j2\pi f_1 66_1}$. New channel ratio, then, can be derived from the below equation 14.

$$\hat{H}_{ratio}(-f_1) = \frac{H(-f_1)e^{j2\pi f_1 \Delta_1}}{H(f_1)e^{-j2\pi f_1 \Delta_1}} = \frac{H(-f_1)e^{j4\pi f_1 \Delta_1}}{H(f_1)} = \quad \text{Eq. 14)}$$

$$H_{ratio}(-f_1)e^{-j4\pi f_1 \Delta}e^{j4\pi f_1 \Delta_1} = H_{ratio}(-f_1)e^{-j4\pi f_1 (\Delta - \Delta_1)}$$

To briefly summarize, the new channel ratio can be derived from an earlier channel ratio by multiplying the earlier channel ratio by a term based on the difference between the delay estimates. Once the delay estimate converges to the ideal delay value and the capture offset is also programmed to the ideal delay value, the channel ratio will approach the ideal ratio of $$\frac{H(-f_1)}{H(f_1)}.$$

This can be observed by setting $\Delta_1 = 0$, and the $\hat{H}_{ratio}(-f_1) = H_{ratio}(-f_1)e^{j4\pi f_1 (\Delta - \Delta_1)}$ becomes $$\frac{H(-f_1)}{H(f_1)}$$

when $\Delta_1 = 0$.

In second scenario, the actual delay between Tx to FB changes. For example, the actual delay changes from value T to T+$t_1$. When the delay estimate has converged to T and the capture offset is also programmed to T, which is an ideal situation, the channel ratio between frequency bin $f_1$ and $-f_1$ is $$H_{ideal,ratio} = \frac{H(-f_1)}{H(f_1)}.$$

When the delay changes to T+$t_1$ but the capture offset is not yet updated from the value of T, the time domain channel response changes to $h(t-t_1)$ and the corresponding channel response at traffic signal bin f1 is expressed as $H(f_1)e^{-j2\pi f_1 t_1}$. Similarly, the corresponding channel response at desired image bin is expressed as $H(-f_1)e^{j2\pi f_1 t_1}$.

Accordingly, new channel ratio may be computed based on below equation 15.

$$\frac{H(-f_1)e^{j2\pi f_1 t_1}}{H(f_1)e^{-j2\pi f_1 t_1}} = \frac{H(-f_1)e^{j4\pi f_1 t_1}}{H(f_1)}. \quad \text{Eq. 15)}$$

This new channel ratio is computed from the ideal channel ratio as $H_{new,ratio} = H_{ideal,ratio}e^{j4\pi f_1 t_1}$. Once the new delay is estimated, the capture offset can be updated.

The capture offset, however, may only be programmed with a certain time or sample resolution. When the capture offset is updated to $t_2$, a residual delay error is denoted as $\Delta_3 = T + t_1 - t_2$. With the capture delay updated to $t_2$, the time domain channel response is expressed as $h(t-\Delta_3)$, the channel response at traffic bin $f_1$ as $H(f_1)e^{-j2\pi f_1 \Delta_3}$ and the channel response at image bin $-f_1$ as $H(-f_1)e^{j2\pi f_1 \Delta_3}$.

Accordingly, the channel ratio with the updated capture offset s expressed below in equation 16.

$$\frac{H(-f_1)e^{j4\pi f_1 \Delta_3}}{H(f_1)} = H_{ideal,ratio}e^{j4\pi f_1 \Delta_3} \quad \text{Eq. 16)}$$

The channel ratio with the updated capture offset may be computed from an earlier ideal channel ratio as $H_{ideal,ratio}e^{j4\pi f_1 \Delta_3} = H_{new,ratio}e^{-j4\pi f_1 \Delta_3} = H_{new,ratio}e^{-j4\pi f_1 (t_1 - \Delta_3)}$.

To update channel ratio based on changes in delay, channel response generating module of 320 of FIG. 4 may further comprise delay estimator 700. Based on the changes in the actual delay or the delay estimate, delay estimator 700 provides the changed values to channel ratio computer 420. Channel ratio computer 420 is configured to generate an updated channel ratio according to equations 14, 15, and 16 based on the input from delay estimator 700.

Figure 8:
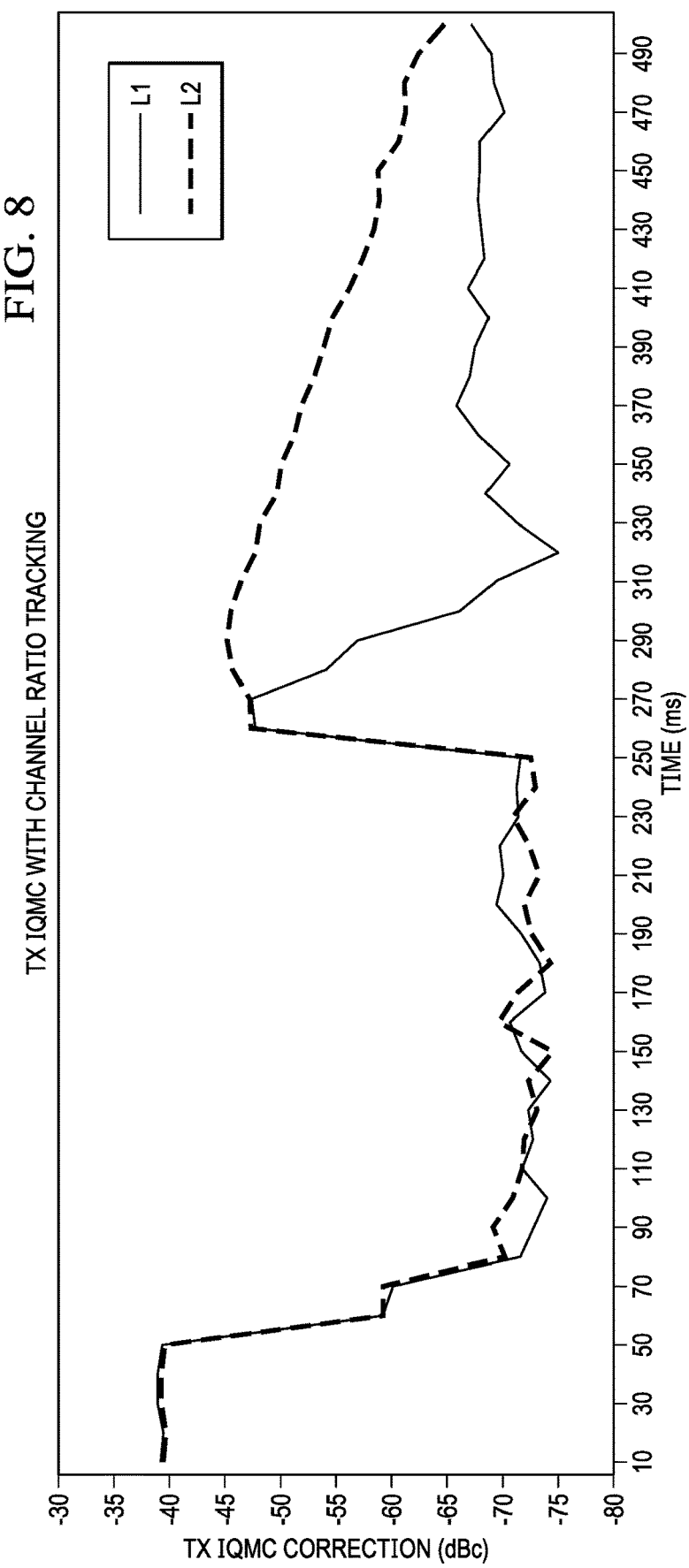
FIG. 8 illustrates a graph demonstrating a difference between IQ mismatch correction results with and without a channel response generating method according to an aspect of the present invention.

FIG. 8 illustrates a graph demonstrating a difference between IQ mismatch correction results with and without a channel response generating method according to an aspect of the present invention. To compare the mismatch correction results, a zero-IF signal transmitter in 0 Celsius degree has been configured to correct its IQ mismatch. The same zero-IF signal transmitter is then placed in a 85 Celsius degree.

A zero-IF signal transmitter that did not employ a channel response generating method according to an example of the present invention was not able to suppress the image signal under −70 dB in relation to the relevant traffic signal even 200 ms after the temperature change. To the contrary, a zero-IF signal transmitter with a channel response generating method according to an example of the present invention was able to suppress the image signal under or around −70 dB in relation to the relevant traffic signal around 30 ms after the temperature change. The image signal suppression measured from zero-IF transmitters with and without a channel response generating method according to an example of the present invention is reflected in lines L1 and L2, respectively.

According to yet another aspect of the present invention, a channel ratio based on various combinations of channel responses is computed and relied upon to derive subsequent channel responses. For instance, a channel ratio computed according to an aspect of the present invention may comprise a channel response at first frequency f1 over a channel response at second frequency f2. Based on the channel ratio of a channel response at first frequency f1 over a channel response at second frequency f2, a subsequent version of channel response at first frequency f1 can be derived after the channel response at first frequency f1 has changed. Either of the channel responses at first frequency f1 and second frequency f2 may comprise an image signal channel response.

The above description and drawings are only to be considered illustrative of an example of the present invention which achieves the features and advantages described herein. Modifications are possible in the described examples, and other examples are possible, within the scope of the claims. Accordingly, the examples of the present invention described herein is not considered as being limited by the foregoing description and drawings.

What is claimed is:

1. A zero-IF signal transmitter comprising:
   an IQ mismatch corrector configured to adjust a baseband signal to compensate for an IQ mismatch;
   a local oscillator directly coupled to the IQ mismatch corrector and configured to up-convert the baseband signal adjusted by the IQ mismatch corrector;
   a feedback module coupled to the local oscillator; and
   a channel response generating module coupled to the feedback module;
   wherein the channel response generating module comprises,
   a channel response estimator;
   a channel ratio computer coupled to the channel response estimator; and
   a channel response tracker coupled to the channel ratio computer and the channel response estimator.

2. The zero-IF signal transmitter of claim 1,
   wherein the channel response generating module is further configured to generate a local oscillator frequency channel response ratio to the first channel response, and
   the zero-IF signal transmitter further comprises a local oscillator (LO) leakage corrector coupled to the channel response generating module and configured to correct the subsequent baseband signal based on an updated local oscillator frequency channel response based on the local oscillator frequency channel response ratio.

3. The zero-IF signal transmitter of claim 2,
   wherein the channel response estimator is further configured to estimate a local oscillator frequency channel response corresponding to a local oscillator frequency bin;
   the channel ratio computer is further configured to compute the local oscillator frequency channel response ratio based on the local oscillator frequency channel response and the first channel response; and
   the channel response tracker is further configured to compute the updated local oscillator frequency channel response based on the local oscillator frequency channel ratio.

4. The zero-IF signal transmitter of claim 3,
   wherein the channel ratio computer is configured to compute the local oscillator frequency channel ratio based on the below:

$$H_{ratio}(LO) = H(LO)/H(f_1)$$

wherein $H_{ratio}(LO)$ is the local oscillator frequency channel ratio, $H(LO)$ is the local oscillator frequency channel response, and $H(f_1)$ is the first channel response.

5. The zero-IF signal transmitter of claim 4,
   wherein the channel response estimator is configured to estimate a subsequent traffic signal channel response at the first frequency bin, and
   the channel response tracker is configured to compute the updated local oscillator frequency channel response according to the below:

$$\hat{H}(f_1) * H_{ratio}(LO)$$

wherein $\hat{H}(f_1)$ is the subsequent traffic signal channel response at the first frequency bin.

* * * * *